United States Patent
Yeh et al.

(10) Patent No.: US 9,965,060 B1
(45) Date of Patent: May 8, 2018

(54) CAPACITIVE STYLUS AND TILT ANGLE DETECTING METHOD THEREOF

(71) Applicant: WALTOP INTERNATIONAL CORPORATION, Hsinchu (TW)

(72) Inventors: Chia-Jui Yeh, Hsinchu (TW); Hung-I Wang, New Taipei (TW)

(73) Assignee: WALTOP INTERNATIONAL CORPORATION, Hsinchu (TW)

( * ) Notice: Subject to any disclaimer, the term of this patent is extended or adjusted under 35 U.S.C. 154(b) by 0 days. days.

(21) Appl. No.: 15/401,731

(22) Filed: Jan. 9, 2017

(30) Foreign Application Priority Data

Nov. 10, 2016 (TW) .............................. 105136634 A

(51) Int. Cl.
  *G06F 3/038* (2013.01)
  *G06F 3/0354* (2013.01)
  *G06F 3/041* (2006.01)

(52) U.S. Cl.
  CPC ........ *G06F 3/0383* (2013.01); *G06F 3/03545* (2013.01); *G06F 3/0416* (2013.01)

(58) Field of Classification Search
  None
  See application file for complete search history.

(56) References Cited

U.S. PATENT DOCUMENTS

| | | | |
|---|---|---|---|
| 8,638,320 B2 | 1/2014 | Harley et al. | |
| 9,213,423 B2 | 12/2015 | Bell | |
| 9,218,073 B1 | 12/2015 | Kremin et al. | |
| 9,310,923 B2 | 4/2016 | Krah et al. | |
| 9,448,646 B1* | 9/2016 | Fleck | G06F 3/03545 |
| 2012/0327042 A1* | 12/2012 | Harley | G06F 3/03545 345/179 |
| 2013/0088465 A1* | 4/2013 | Geller | G06F 3/03545 345/179 |
| 2014/0049478 A1* | 2/2014 | Brunet | G06F 3/0416 345/173 |
| 2015/0077403 A1* | 3/2015 | Bell | G06F 3/03545 345/179 |
| 2017/0068344 A1* | 3/2017 | Bhandari | G06F 3/03545 |
| 2017/0115753 A1* | 4/2017 | Mao | G06F 3/03545 |
| 2017/0357338 A1* | 12/2017 | Bell | G06F 3/03545 |

FOREIGN PATENT DOCUMENTS

TW 201608424 A 3/2016

\* cited by examiner

*Primary Examiner* — Nicholas Lee
(74) *Attorney, Agent, or Firm* — Li & Cai Intellectual Property (USA) Office

(57) ABSTRACT

This instant disclosure is related to a capacitive stylus and a tilt angle detecting method thereof. The capacitive stylus is acting on a touch pad. The capacitive stylus includes a sensing electrode unit and a driving electrode unit, or the capacitive stylus is provided with a first sensing electrode unit and a second sensing electrode unit. The capacitive stylus further includes a tilt angle corresponding table and a direction corresponding table to determine the tilt angle and tilt direction of the capacitive stylus on the touch pad.

10 Claims, 6 Drawing Sheets

| Tilt angle corresponding table |||||
|---|---|---|---|---|
| XRX | XTX | YRX | YTX | Tilt angle |
| ○○ | ** | ○○ | ** | 0° |
| ○○○ | *** | ○○○ | *** | 1° |
| ⋮ | ⋮ | ⋮ | ⋮ | ⋮ |
| △△ | □□ | △△ | □□ | 90° |

FIG. 3

| Direction corresponding table ||||
|---|---|---|---|
| X'=XRX+XTX | Y'=YRX+YTX | (X',Y') | Directions |
| OO | ** | (OO,XX) | East |
| OOO | *** | (OOO,XXX) | East-South |
| ⋮ | ⋮ | ⋮ | ⋮ |
| △△ | □□ | (△△,□□) | West |

FIG. 4

CAPACITIVE STYLUS AND TILT ANGLE DETECTING METHOD THEREOF

BACKGROUND

1. Technical Field

The instant disclosure relates to a capacitive stylus and tilt angle detecting method thereof, in particular, to a capacitive stylus having a sensing electrode unit and a driving electrode unit for detecting the tilt angle and tilt direction of the capacitive stylus and method of using the same.

2. Description of Related Art

The existing capacitive stylus products do not have the function of detecting the tilt angle of the capacitive stylus products. Therefore, further applications of the capacitive stylus for touch devices under different tilt angles are limited. In addition, there is a need for a device or method for detecting the tilt angle and tilt direction of a capacitive stylus on a touch pad while avoiding increasing the complexity of the electronic devices.

SUMMARY

The instant disclosure is related to a capacitive stylus and a tilt angle detecting method thereof, the capacitive stylus is acting on a touch pad, and the capacitive stylus comprises: a battery; a micro-controller coupled to the battery; a sensing and driving signals processing unit coupled to the micro-controller; a sensing electrode unit coupled to the sensing and driving signals processing unit; and a driving electrode unit coupled to the sensing and driving signals processing unit. The micro-controller has a tilt angle corresponding table. The sensing electrode unit is acting on the touch pad to generate a first axis signal of the sensing electrode unit and a second axis signal of the sensing electrode unit; the driving electrode unit is acting on the touch pad to generate a first axis signal of the driving electrode unit and a second axis signal of the driving electrode unit; and a tilt angle of the capacitive stylus on the touch pad is obtained by corresponding the first axis of the sensing electrode unit, the first axis signal of the driving electrode unit, the second axis signal of the sensing electrode unit and the second axis signal of the driving electrode unit to the tilt angle corresponding table.

In a preferred embodiment, the micro-controller has a direction corresponding table for obtaining a tilt direction of the capacitive stylus on the touch pad.

In a preferred embodiment, the direction corresponding table is configured to obtain the tilt direction by receiving a first axis signal and a second axis signal; the first axis signal is related to the first axis signal of the sensing electrode unit and the first axis signal of the driving electrode unit; the second axis signal is related to the second axis signal of the sensing electrode unit and the second axis signal of the driving electrode unit.

The instant disclosure is further related to a capacitive stylus acting on a touch pad. The capacitive stylus comprises: a battery; a micro-controller coupled to the battery; a sensing and driving signals processing unit coupled to the micro-controller; a first sensing electrode unit coupled to the sensing and driving signals processing unit; and a second sensing electrode unit coupled to the sensing and driving signals processing unit. The micro-controller has a tilt angle corresponding table. the first sensing electrode unit is acting on the touch pad to generate a first axis signal of the first sensing electrode unit and a second axis signal of the second sensing electrode unit; the second sensing electrode unit is acting on the touch pad to generate a first axis signal of the second sensing electrode unit and a second axis signal of the second sensing electrode unit; and a tilt angle of the capacitive stylus on the touch pad is obtained by corresponding the first axis signal of the sensing electrode unit, the first axis signal of the driving electrode unit, the second axis signal of the sensing electrode unit and the second axis signal of the driving electrode unit to the tilt angle corresponding table.

In a preferred embodiment, the micro-controller has a direction corresponding table for obtaining a tilt direction of the capacitive stylus on the touch pad.

In a preferred embodiment, the direction tilt corresponding table is configured to obtain the tilt direction by receiving a first axis signal and a second axis signal; the first axis signal is related to the first axis signal of the sensing electrode unit and the first axis signal of the driving electrode unit; the second axis signal is related to the second axis signal of the sensing electrode unit and the second axis signal of the driving electrode unit.

The instant disclosure is further related to a tilt angle detecting method applied to the capacitive stylus described above. The method comprises: turning-on the capacitive stylus and disposing the capacitive stylus on a touch pad; retrieving a first axis signal of a sensing electrode unit and a first axis signal of a driving electrode unit; retrieving a second axis signal of a sensing electrode unit and a second axis signal of a driving electrode unit; corresponding the first axis signal of the sensing electrode unit, the first axis signal of the driving electrode unit, the second axis signal of the sensing electrode unit and the second axis signal of the driving electrode unit to the tilt angle corresponding table; and obtaining a tilt angle of the capacitive stylus.

The step of corresponding the first axis signal of the sensing electrode unit, the first axis signal of the driving electrode unit, the second axis signal of the sensing electrode unit and the second axis signal of the driving electrode unit to the tilt angle corresponding table is carried out by a micro-processer disposed in the capacitive stylus.

In a preferred embodiment, after the step of retrieving a second axis signal of the sensing electrode unit and a second axis signal of the driving electrode unit, the method further comprises: retrieving a sum of the first axis signal of the sensing electrode unit and the first axis signal of the driving electrode unit as a first axis signal; retrieving a sum of the second axis signal of the sensing electrode unit and the second axis signal of the driving electrode unit as a second axis signal; corresponding the first axis signal and the second axis signal to a direction corresponding table; and obtaining a tilt direction of the capacitive stylus.

In a preferred embodiment, the direction corresponding table is built-in into the micro-controller of the capacitive stylus, and the step of corresponding the first axis signal and the second axis signal to the direction corresponding table is carried out by the micro-controller.

In a preferred embodiment, the direction corresponding table comprises a plurality of directions corresponding to four quadrants on the touch pad.

To sum up, the instant disclosure can achieve the technical effect of detecting the tilt angle and tilt direction of a capacitive stylus while maintaining the simple and uncomplicated design of the capacitive stylus and reducing the cost and price of the capacitive stylus. Therefore, the capacitive stylus and method of using the same provided by the instant disclosure can be used to generate and stimulate the effect of spray guns, or the strokes or spraying effect of paint pens and watercolor pens.

In order to further understand the techniques, means and effects of the instant disclosure, the following detailed descriptions and appended drawings are hereby referred to, such that, and through which, the purposes, features and aspects of the instant disclosure can be thoroughly and concretely appreciated; however, the appended drawings are merely provided for reference and illustration, without any intention to be used for limiting the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

FIG. 3 is a tilt angle corresponding table of the first embodiment of the instant disclosure.

FIG. 4 is a direction corresponding table of the first embodiment of the instant disclosure.

DESCRIPTION OF THE EXEMPLARY EMBODIMENTS

Figure 1:
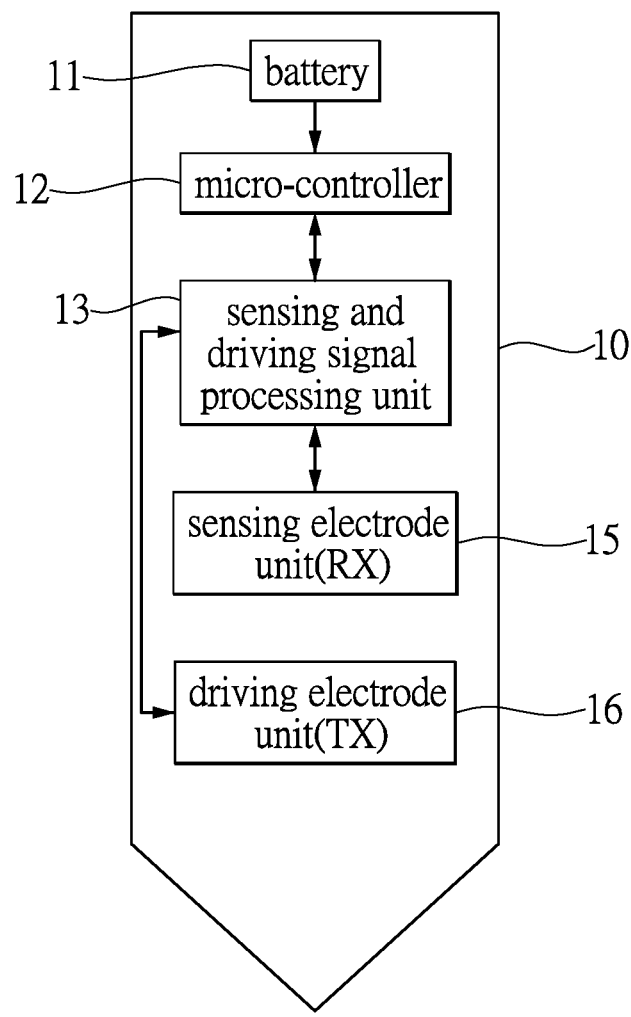
FIG. 1 is a circuit block diagram of the first embodiment of the instant disclosure.

Reference will now be made in detail to the exemplary embodiments of the instant disclosure, examples of which are illustrated in the accompanying drawings. Wherever possible, the same reference numbers are used in the drawings and the description to refer to the same or like parts.

First Embodiment

Figure 2:
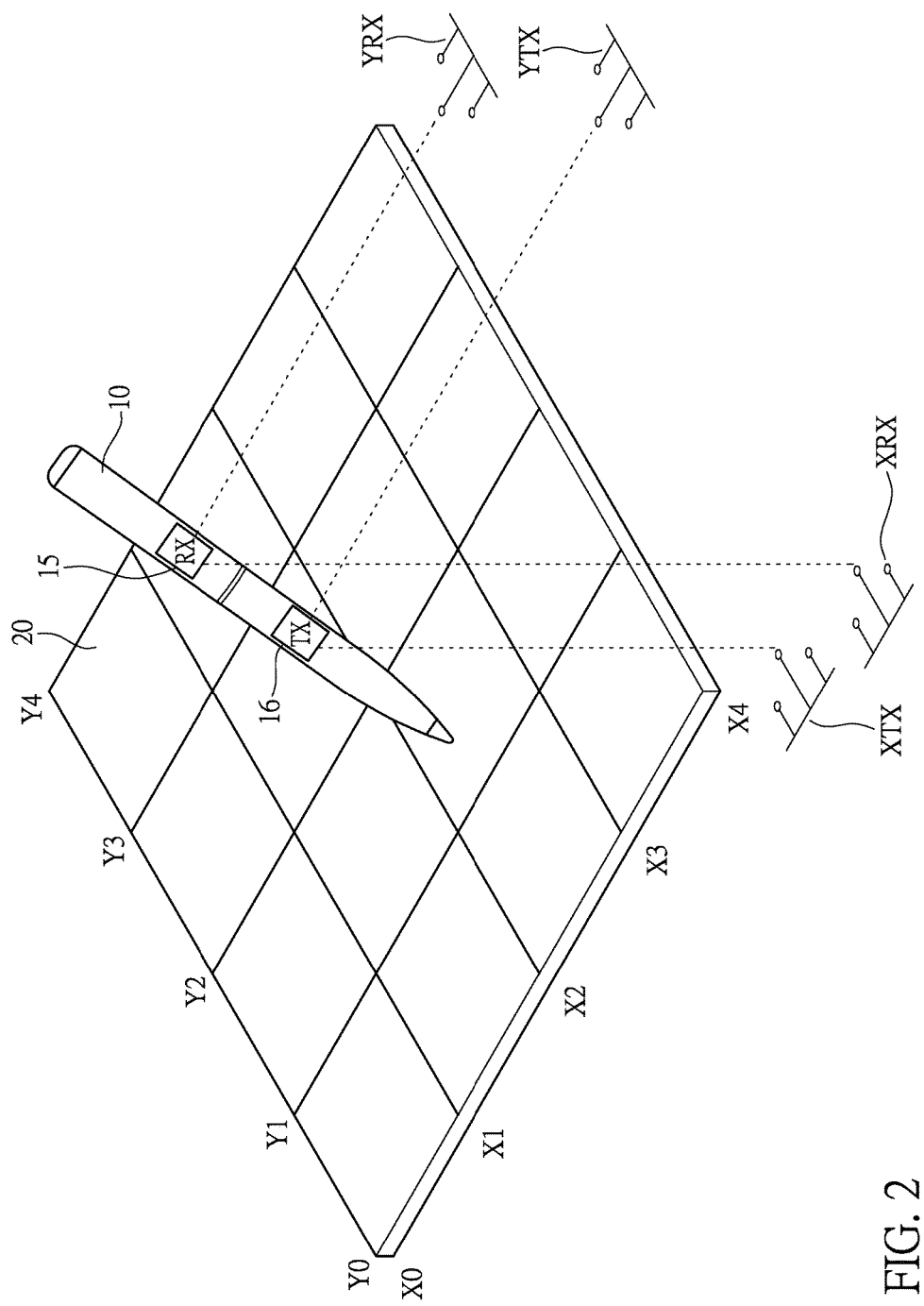
FIG. 2 is a schematic view of the first embodiment of the instant disclosure.

The circuit block diagram in the capacitive stylus 10 is shown in FIG. 1. The capacitive stylus 10 of the instant disclosure is acting on a touch pad 20 (as shown in FIG. 2) and comprises a battery 11, a micro-controller 12, a sensing and driving signals processing unit 13, a sensing electrode unit 15 (RX) and a driving electrode unit 16 (TX). The battery 11 is used to provide power to the capacitive stylus 10. The micro-controller 12 is coupled to the battery 11 and has a built-in tilt angle corresponding table (as shown in FIG. 3). The micro-controller 12 is the signal controlling center of the capacitive stylus 10. The sensing and driving signals processing unit 13 is coupled to the micro-controller 12 for executing the transmitting, receiving and processing of the sensing electrode signals and driving electrode signals, and the signals are further controlled and analyzed based on the tilt angle corresponding table by the micro-controller 12.

The sensing electrode unit 15 is coupled to the sensing and driving signals processing unit 13. The sensing electrode unit 15 is acting on the touch pad 20 to further generate a first axis signal of the sensing electrode unit XRX and a second axis signal of the sensing electrode unit YRX. The driving electrode unit 16 is coupled to the sensing and driving signals processing unit 13 as well. The driving electrode unit 16 is acting on the touch pad 20 to generate a first axis signal of the driving electrode unit XTX and a second axis signal of the driving electrode unit YTX, as shown in FIG. 2.

Please refer to FIG. 2. The sensing electrode unit 15 and the driving electrode unit 16 disposed in the capacitive stylus 10 are acting on the touch pad 20 and generate the first axis signal of the sensing electrode unit XRX, the second axis signal of the sensing electrode unit YRX, the first axis signal of the driving electrode unit XTX and the second axis signal of the driving electrode unit YTX. It is worthwhile to mention that the four signals are only examples, and the instant disclosure is not limited thereto. In other words, the user can increase the numbers of the sensing and driving electrode signals based on actual need or increase to a third axis signal.

In FIG. 2, a three-point position method can be used to position the component corresponding to the locations of the sensing electrode unit 15 and driving electrode unit 16 acting on the touch pad 20 based on the first axis signal of the sensing electrode unit XRX, the second axis signal of the sensing electrode unit YRX, the first axis signal of the driving electrode unit XTX and the second axis signal of the driving electrode unit YTX. The horizontal axis of the touch pad 20 is labeled as X0, X1, X2, X3 and X4, and the vertical axis of the touch pad 20 is labeled as Y0, Y1, Y2, Y3 and Y4. These symbols are only used for to exemplify the bi-axis coordinate of the touch pad 20 and are not used to limit the scope of the instant disclosure. For example, a third axis (for example, Z axis) can be used. In addition, the instant disclosure is not limited to a coordinate using the three-point position method. Other position methods can be used, such as a method employing the length of the axis and the included angle.

When the capacitive stylus 10 is acting on the touch pad 20, the driving electrode unit 16 can transmit a driving electrode signal to the touch pad 20, and the driving electrode single can be transmitted back to the capacitive stylus 10 for processing, or the driving electrode signal can be processed by the touch pad 20 itself. Similarly, the sensing electrode unit 15 can transmit a sensing electrode signal to the touch pad 20, and the sensing electrode signal can be transmitted back to the capacitive stylus 10 for processing, or the sensing electrode signal can be processed by the touch pad 20 itself. The instant disclosure is not limited thereto. In other words, the processing of the sensing electrode signals and the driving electrode signals can be performed in the capacitive stylus 10 or in the touch pad 20.

FIG. 3 shows the tilt angle corresponding table built-into the micro-controller 12 of the capacitive stylus 10. The capacitive stylus 10 is acting on the touch pad 20 for obtaining the first axis signal of the sensing electrode unit XRX, the second axis signal of the sensing electrode unit YRX, the first axis signal of the driving electrode unit XTX and the second axis signal of the driving electrode unit YTX, and these signals are transmitted to the micro-controller 12 after being processed by the sensing and driving signals processing unit 13. The micro-controller 12 performs the comparison between the signals, obtaining a tilt angle of the capacitive stylus 10 disposed on the touch pad 20 by corresponding the signals to the content of the tilt angle corresponding table, thereby achieving the object of the instant disclosure. The values of the detected signals are labeled as OO, **, ΔΔ and □□, and these values are only examples of the instant disclosure.

FIG. 4 is the direction corresponding table built-into the micro-controller 12 of the capacitive stylus 10. X' is the first axis signal, Y' is the second axis signal, and the first axis signal X'=XRX+XTX; and the second axis signal Y'=YRX+YTX. In other words, the first axis signal X' is related to the first axis signal of the sensing electrode unit XRX and the first axis signal of the driving electrode unit XTX and can be the sum of these two signals; and the second axis signal Y' is related to the second axis signal of the sensing electrode unit YRX and the second axis signal of the driving electrode unit YTX and can be the sum of these two signals. When the first axis signal X' and the second axis signal Y' are obtained, the tilt direction of the capacitive stylus 10 on the touch pad 20 can be obtained by corresponding the first axis signal X' and the second axis signal Y' to the direction corresponding table. It is worthwhile to mention that the two individual signals and the use of the sum thereof are only an example. In other words, the user can employ the difference of the two signals, or obtain a statement value by multiply or dividing the two signals to obtain the tilt direction of the capacitive stylus 10 on the touch pad 20. The instant disclosure is not limited thereto.

In addition, the direction corresponding table shown in FIG. 4 comprises directions corresponding to the four quadrants on a plane on which the touch pad 20 is disposed. In other words, the surface of the touch pad 20 can be divided into four quadrants, and the locations of the four quadrants correspond to the tilt direction of the capacitive stylus 10. The directions can also be defined as east, east-south, east-north . . . west-north or west. The direction corresponding table is built-into the micro-controller 12 of the capacitive stylus 10, and the corresponding process is carried out by the micro-controller 12 for obtaining the tilt direction.

Figure 5:
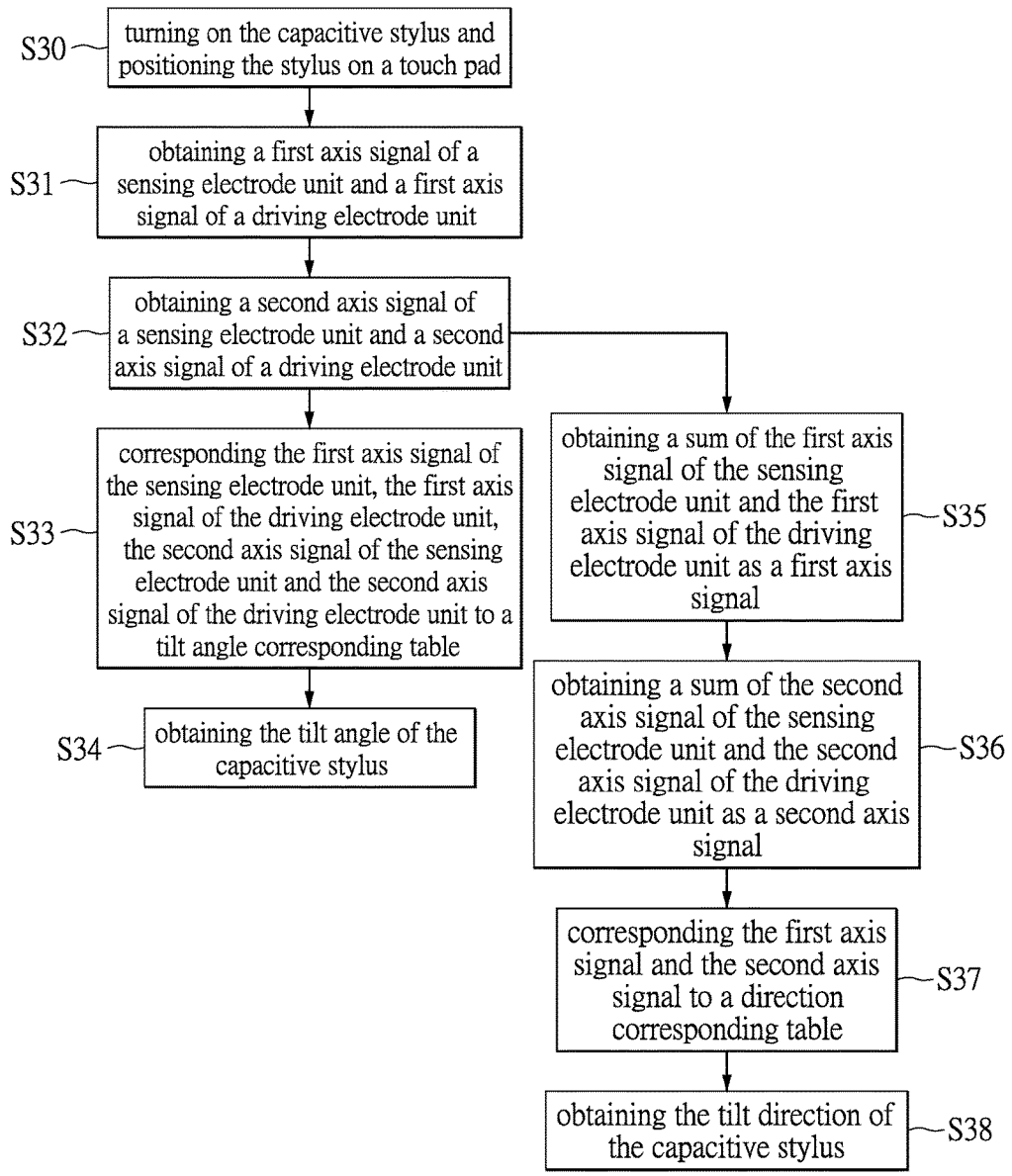
FIG. 5 is a flow diagram of the first embodiment of the instant disclosure.

FIG. 5 shows the steps of a tilt angle detecting method for a capacitive stylus, comprising: step S30, turning on the capacitive stylus and positioning the stylus on a touch pad; step S31, obtaining a first axis signal of a sensing electrode unit and a first axis signal of a driving electrode unit; step S32, obtaining a second axis signal of a sensing electrode unit and a second axis signal of a driving electrode unit; step S33, corresponding the first axis signal of the sensing electrode unit, the first axis signal of the driving electrode unit, the second axis signal of the sensing electrode unit and the second axis signal of the driving electrode unit to a tilt angle corresponding table; and step S34, obtaining the tilt angle of the capacitive stylus. In other words, the tilt angle of the capacitive stylus 10 acting on the touch pad 20 can be obtained by steps S30 to S34 shown in FIG. 5.

In addition, after performing step S32, steps S35 to S38 can be performed. Step S35 comprises obtaining a sum of the first axis signal of the sensing electrode unit and the first axis signal of the driving electrode unit as a first axis signal. Step S36 comprises obtaining a sum of the second axis signal of the sensing electrode unit and the second axis signal of the driving electrode unit as a second axis signal. Step S37 comprises corresponding the first axis signal and the second axis signal to a direction corresponding table. Step S38 comprises obtaining the tilt direction of the capacitive stylus. The tilt direction of the capacitive stylus 10 acting on the touch pad 20 can be further obtained by performing steps S35 to S38 shown in FIG. 5.

Figure 6:
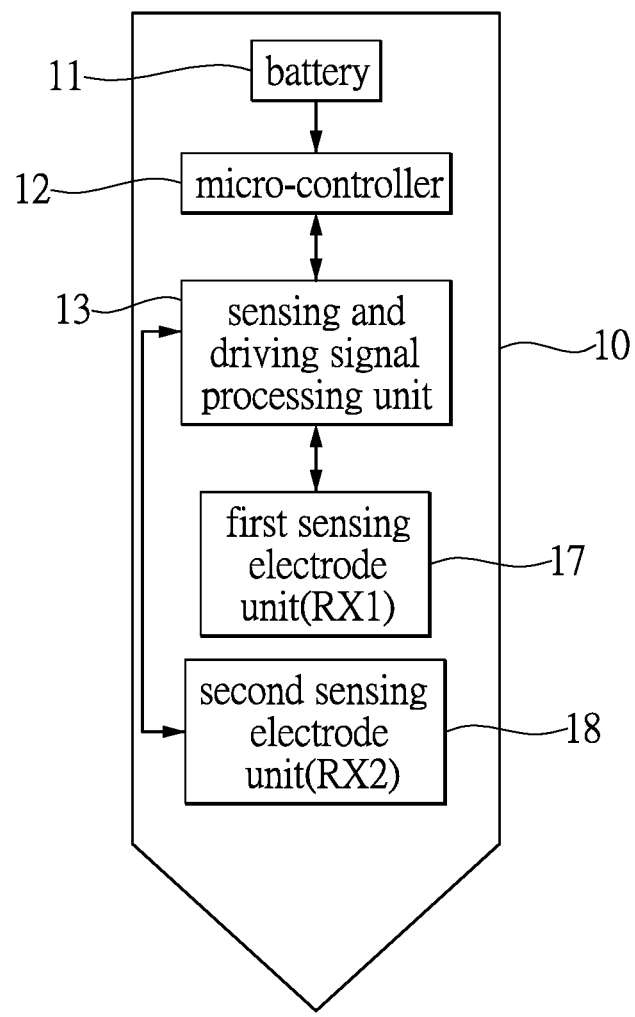
FIG. 6 is a circuit block diagram of the second embodiment of the instant disclosure.

FIG. 6 shows the second embodiment of the capacitive stylus 10a of the instant disclosure. The difference between the embodiment of FIG. 6 and the embodiment of FIG. 1 is that the sensing electrode unit 15 and the driving electrode unit 16 in FIG. 6 are replaced by the first sensing electrode unit 17 (RX1) and the second sensing electrode unit 18 (RX2). The connection between the first sensing electrode unit 17 and the second sensing electrode unit 18 is described herein. The first sensing electrode unit 17 is coupled to the sensing and driving signals processing unit 13, and the second sensing electrode unit 18 is also coupled to the sensing and driving signals processing unit 13. In addition, as described in the first embodiment, the first sensing electrode unit 17 is acting on the touch pad 20 to generate a first axis signal of the first sensing electrode unit and a second axis signal of the first sensing electrode unit; and the second sensing electrode unit 18 is acting on the touch pad 20 to generate a first axis signal of the second sensing electrode unit and a second axis signal of the second sensing electrode unit. The first axis signal of the first sensing electrode unit, the first axis signal of the second sensing electrode unit, the second axis signal of the first sensing electrode unit and the second axis signal of the second sensing electrode unit are corresponding to a tilt angle corresponding table in the micro-controller 12 of the capacitive stylus 10a. Afterward, a tilt angle of the capacitive stylus 10a on the touch pad 20 can be obtained.

In the second embodiment shown in FIG. 6, a direction corresponding table is built-into the micro-controller 12 of the capacitive stylus 10a for obtaining the tilt direction of the capacitive stylus 10a on the touch pad 20. The direction corresponding table can be used to obtain the tilt direction by receiving a first axis signal and a second axis signal. The first axis signal is related to the first axis signal of the first sensing electrode unit and the first axis signal of the second sensing electrode unit. For example, the first axis signal is the sum of the first axis signal of the first sensing electrode unit and the first axis signal of the second sensing electrode unit. The second axis signal is related to the second axis signal of the first sensing electrode unit and the second axis signal of the second sensing electrode unit. For example, the second axis signal is the sum of the second axis signal of the first sensing electrode unit and the second axis signal of the second sensing electrode unit. The direction corresponding table is built-into the micro-controller 12 of the micro-controller 10a and the corresponding process is carried out by the micro-controller 12 for obtaining the tilt direction of the capacitive stylus 10a. The direction is the directions of the four quadrants on a plane on which the touch pad 20 is disposed. The directions can also be defined as east, east-south, east-north . . . west-north or west directions.

In addition, in the embodiments of the instant disclosure, two sensing electrode units and a driving electrode unit can be used in a capacitive stylus. In other words, the capacitive stylus can comprise two sensing electrode units (RX1, RX2) and a driving electrode unit (TX). The numbers of the sensing electrode unit and the driving electrode unit are not limited in the instant disclosure.

In summary, the capacitive stylus and the tilt angle detecting method for the same can accurately detect the tilt angle and the tilt direction of the capacitive stylus while maintaining a simple and uncomplicated design and low cost (price) of the device by the use of the combination of the sensing electrode unit 15 and the driving electrode unit 16, or the combination of the first sensing electrode unit 17 and the second sensing electrode unit 18, in combination with the tilt angle corresponding table and the tilt direction corresponding table. Furthermore, the capacitive stylus provided by the instant disclosure can stimulate the spraying effect of a spray gun and the effect of paint pens or watercolor pens.

The above-mentioned descriptions represent merely the exemplary embodiment of the present disclosure, without any intention to limit the scope of the instant disclosure thereto. Various equivalent changes, alterations or modifications based on the claims of the instant disclosure are all consequently viewed as being embraced by the scope of the instant disclosure.

What is claimed is:

1. A capacitive stylus acting on a touch pad, comprising:
   a battery;
   a micro-controller coupled to the battery, the micro-controller having a tilt angle corresponding table;
   a sensing and driving signals processing unit coupled to the micro-controller;
   a sensing electrode unit coupled to the sensing and driving signals processing unit; and
   a driving electrode unit coupled to the sensing and driving signals processing unit;
   wherein the sensing electrode unit is acting on the touch pad to generate a first axis signal of the sensing electrode unit and a second axis signal of the sensing electrode unit; the driving electrode unit is acting on the touch pad to generate a first axis signal of the driving electrode unit and a second axis signal of the driving electrode unit; and a tilt angle of the capacitive stylus on the touch pad is obtained by corresponding the first axis signal of the sensing electrode unit, the first axis signal of the driving electrode unit, the second axis signal of the sensing electrode unit and the second axis signal of the driving electrode unit to the tilt angle corresponding table.

2. The capacitive stylus according to claim 1, wherein the micro-controller has a direction corresponding table for obtaining a tilt direction of the capacitive stylus on the touch pad.

3. The capacitive stylus according to claim 2, wherein the direction corresponding table is configured to obtain the tilt direction by receiving a first axis signal and a second axis signal; the first axis signal is related to the first axis signal of the sensing electrode unit and the first axis signal of the driving electrode unit; the second axis signal is related to the second axis signal of the sensing electrode unit and the second axis signal of the driving electrode unit.

4. A capacitive stylus acting on a touch pad, comprising:
   a battery;
   a micro-controller coupled to the battery, the micro-controller having a tilt angle corresponding table;
   a sensing and driving signals processing unit coupled to the micro-controller;
   a first sensing electrode unit coupled to the sensing and driving signals processing unit; and
   a second sensing electrode coupled to the sensing and driving signals processing unit;
   wherein the first sensing electrode unit is acting on the touch pad to generate a first axis signal of the first sensing electrode unit and a second axis signal of the first sensing electrode unit; the second sensing electrode unit is acting on the touch pad to generate a first axis signal of the second sensing electrode unit and a second axis signal of the second sensing electrode unit; and a tilt angle of the capacitive stylus on the touch pad is obtained by corresponding the first axis of first sensing electrode unit, the first axis signal of the second sensing electrode unit, the second axis signal of the first sensing electrode unit and the second axis signal of the second sensing electrode unit to the tilt angle corresponding table.

5. The capacitive stylus according to claim 4, wherein the micro-controller has a direction corresponding table for obtaining a tilt direction of the capacitive stylus on the touch pad.

6. The capacitive stylus according to claim 5, wherein the direction tilt corresponding table is configured to obtain the tilt direction by receiving a first axis signal and a second axis signal; the first axis signal is related to the first axis signal of the first sensing electrode unit and the first axis signal of the second sensing electrode unit; the second axis signal is related to the second axis signal of the first sensing electrode unit and the second axis signal of the second sensing electrode unit.

7. A tilt angle detecting method applied to the capacitive stylus according to claim 1, comprising:
   turning-on the capacitive stylus and disposing the capacitive stylus on a touch pad;
   retrieving a first axis signal of the sensing electrode unit and a first axis signal of the driving electrode unit;
   retrieving a second axis signal of the sensing electrode unit and a second axis signal of the driving electrode unit;
   corresponding the first axis signal of the sensing electrode, the first axis signal of the driving electrode unit, the second axis signal of the sensing electrode unit and the second axis signal of the driving electrode unit to the tilt angle corresponding table; and
   obtaining a tilt angle of the capacitive stylus;
   wherein the step of corresponding the first axis signal of the sensing electrode unit, the first axis signal of the driving electrode unit, the second axis signal of the sensing electrode unit and the second axis signal of the driving electrode unit to the tilt angle corresponding table is carried out by a micro-processor disposed in the capacitive stylus.

8. The tilt angle detecting method according to claim 7, after the step of retrieving a second axis signal of the sensing electrode unit and a second axis signal of the driving electrode unit, further comprising:
   retrieving a sum of the first axis signal of the sensing electrode unit and the first axis signal of the driving electrode unit as a first axis signal;
   retrieving a sum of the second axis signal of the sensing electrode unit and the second axis signal of the driving electrode unit as a second axis signal;
   corresponding the first axis signal and the second axis signal to a direction corresponding table; and
   obtaining a tilt direction of the capacitive stylus.

9. The tilt angle detecting method according to claim 8, wherein the direction corresponding table is built-into the micro-controller of the capacitive stylus, and the step of corresponding the first axis signal and the second axis signal to the direction corresponding table is carried out by the micro-controller.

10. The tilt angle detecting method according to claim 8, wherein the direction corresponding table comprises a plurality of directions corresponding to four quadrants on the touch pad.

* * * * *